United States Patent
Udayakumaran

(10) Patent No.: US 8,933,954 B2
(45) Date of Patent: Jan. 13, 2015

(54) REGISTER ALLOCATION FOR GRAPHICS PROCESSING

(75) Inventor: Sumesh Udayakumaran, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 966 days.

(21) Appl. No.: 13/069,702

(22) Filed: Mar. 23, 2011

(65) Prior Publication Data

US 2012/0242673 A1 Sep. 27, 2012

(51) Int. Cl.
- G09G 5/36 (2006.01)
- G06T 1/60 (2006.01)
- G06F 13/00 (2006.01)
- G06F 9/45 (2006.01)
- G06T 1/20 (2006.01)

(52) U.S. Cl.
CPC *G06F 8/441* (2013.01); *G06F 8/44* (2013.01); *G06T 1/20* (2013.01); *G09G 5/363* (2013.01); *G09G 2360/08* (2013.01)
USPC .......................... 345/559; 345/530; 345/536

(58) Field of Classification Search
CPC ............ G06F 15/8053; G06F 15/8076; G06F 15/8084
USPC .......................................... 345/530, 536, 559
See application file for complete search history.

(56) References Cited

U.S. PATENT DOCUMENTS

| | | | |
|---|---|---|---|
| 4,571,678 A | 2/1986 | Chaitin | |
| 4,710,867 A * | 12/1987 | Watanabe | 712/8 |
| 4,782,444 A | 11/1988 | Munshi et al. | |
| 5,187,796 A | 2/1993 | Wang et al. | |
| 5,249,295 A | 9/1993 | Briggs et al. | |
| 5,530,866 A | 6/1996 | Koblenz et al. | |
| 5,745,721 A | 4/1998 | Beard et al. | |
| 6,734,874 B2 | 5/2004 | Lindholm et al. | |
| 6,954,841 B2 * | 10/2005 | Moreno et al. | 712/9 |
| 7,529,918 B2 * | 5/2009 | Taunton | 712/300 |
| 7,822,947 B2 * | 10/2010 | Ford et al. | 712/200 |
| 2004/0237074 A1 | 11/2004 | Aronson et al. | |
| 2007/0074009 A1 | 3/2007 | Donofrio et al. | |
| 2008/0005722 A1 * | 1/2008 | Matsuzaki | 717/122 |
| 2008/0235316 A1 | 9/2008 | Du et al. | |
| 2012/0151182 A1 * | 6/2012 | Madajczak | 712/5 |

OTHER PUBLICATIONS

Soliman et al., "Trident: A Scalable Architecture for Scalar, Vector, and Matrix Operations," Asia-Pacific Computer Systems Architecture Conference, vol. 6, 9 pp.

Cheng, "LLVM Register Allocation," PowerPoint presentation, Aug. 1, 2008, 35 pp.

Poletto et al., "Linear Scan Register Allocation," ACM Transactions on Programming Language and Systems, vol. 21, No. 5, Sep. 1999, pp. 895-913.

(Continued)

*Primary Examiner* — Joni Richer
(74) *Attorney, Agent, or Firm* — James R. Gambale, Jr.

(57) ABSTRACT

In general, aspects of this disclosure describe a compiler for allocation of physical registers for storing constituent scalar values of a non-scalar value. In some example, the compiler, executing on a processor, may receive an instruction for operation on a non-scalar value. The compiler may divide the instruction into a plurality of instructions for operation on constituent scalar values of the non-scalar value. The compiler may allocate a plurality of physical registers to store the constituent scalar values.

34 Claims, 5 Drawing Sheets

(56) References Cited

OTHER PUBLICATIONS

LLVM Language Reference Manual, found at http://llvm.org/docs/LangRef.html, last modified Feb. 24, 2011, 64 pp.
Wikipedia page, "Code generation (compiler)," last modified Feb. 8, 2011, 2 pp.
Modern Compiler Implementation in Java 1997 ( ):0:3-13.
Allen, R. et al., "Vector Register Allocation", IEEE Transactions on Computers, Oct. 1, 1992, pp. 1290-1317, vol. 41, No. 10, IEEE Service Center, XP000328606, ISSN: 0018-9340, DOI: 10.1109/12.166606.
Briggs, P. et al., "Coloring register pairs", ACM Letters on Programming Languages and Systems, Mar. 1, 1992, pp. 3-13, vol. 1, No. 1, XP55035813, ISSN: 1057-4514, DOI: 10.1145/130616.130617.

International Search Report and Written Opinion—PCT/US2012/030202—ISA/EPO—Aug. 29, 2012.

Krall, A. et al., "Compilation Techniques for Multimedia Processors", International Journal of Parallel Programming, Aug. 1, 2000, pp. 347-361, vol. 28, No. 4, Plenum Press, XP002380271, ISSN: 0885-7458, DOI: 10.1023/A:1007507005174.

Nickerson, "Graph coloring register allocation for processors with multi-register operands", Proceedings of the ACM SIGPLAN 1990 Conference on Programming Language Design and Implementation, Jun. 1, 1990, pp. 40-52, XP55035812, DOI: 10.1145/93542.93552 ISBN: 978-0-89-791364-5.

\* cited by examiner

```
vec2 a;
vec2 b; //b is a vector with 2
components x, y
main()
{
    a = b;
}
```

FIG. 2A

```
@a = common global v2i32 0
@b = common global v2i32 0 define void @main()
{
entry:
    %tmp = load @b, 2
    store %tmp, @a, 2
}
```

FIG. 2B

```
@a = common global v2i32 0
@b = common global v2i32 0 define void @main()
{
entry:
    VR0 = load @b, 1
    VR1 = load @b+1, 1
    combine VR0, VR1
    store VR0, @a, 1
    store VR1, @a+1, 1
}
```

FIG. 2C

```
@a = common global v2i32 0
@b = common global v2i32 0 define void @main()
{
entry:
    %R0 = load @b, 1
    %R1 = load @b+1, 1
    combine %R0, %R1
    store %R0, @a, 1
    store %R1, @a+1, 1
}
```

FIG. 2D

```
@a = common global v2i32 0
@b = common global v2i32 0 define void @main()
{
entry:
    {%R0, %R1} = load @b, 2
    store {%R0, %R1} @a, 2
}
```

FIG. 2E

REGISTER ALLOCATION FOR GRAPHICS PROCESSING

TECHNICAL FIELD

This disclosure relates to register allocation and, more particularly, to compilers that allocate registers to store values used by a graphics processing unit (GPU).

BACKGROUND

A processor on a computing device executes a compiler to translate instructions of a program into machine code. One of the tasks of the compiler executed by the processor is to allocate registers to store values associated with the instructions, referred to as register allocation. Because not all values may be in use by the instructions at the same time, the compiler may assign different values to the same register. However, the compiler may not assign multiple values in use at the same time to the same register. For values that cannot be assigned to a register at a given time, the compiler may store such values within random access memory (RAM). In general, however, it may be more efficient to access values from the registers, than from RAM.

SUMMARY

This disclosure describes techniques for a processor executing a compiler to allocate physical registers for storing values used in a graphics processing unit (GPU) program when translating the instructions of the GPU program into machine code. The instructions of the GPU program may require operations on non-scalar values. Non-scalar values may be values that cannot be stored in a single physical register, and require two or more physical registers for storage. The compiler may divide an instruction that requires operation on a non-scalar value into a plurality of instructions that require operation on scalar values that are constituents of the non-scalar value, i.e., sub-values of the non-scalar value. Scalar values may be values that can be stored in a single physical register. The compiler may also associate the allocated registers that store scalar values to maintain the relationship of the constituent scalar values with the non-scalar value whose constituents are the scalar values.

In one example, this disclosure describes a method comprising receiving, with a processor executing a compiler, a program with at least one instruction for graphics processing for operation on at least one non-scalar value, wherein the at least one non-scalar value comprises a value that cannot be stored in a single physical register of a specified size, dividing, with the processor executing the compiler, the at least one instruction for operation on the at least one non-scalar value into a plurality of instructions for operation on constituent scalar values of the at least one non-scalar value, wherein each one of the constituent scalar values can be stored in the single physical register of the specified size, and allocating, with the processor executing the compiler, a plurality of physical registers to store the constituent scalar values.

In another example, this disclosure describes a device comprising a plurality of physical registers that are each of a specified size, and a processor executing a compiler that receives a program with at least one instruction for graphics processing for operation on at least one non-scalar value, wherein the at least one non-scalar value comprises a value that cannot be stored in the specified size of a single physical register of the plurality of physical registers, divides the at least one instruction for operation on the at least one non-scalar value into a plurality of instructions for operation on constituent scalar values of the at least one non-scalar value, wherein each one of the constituent scalar values can be stored in the specified size of the single physical register, and allocates two or more physical registers of the plurality of physical registers to store the constituent scalar values.

In another example, this disclosure describes a non-transitory computer-readable storage medium comprising instructions for a compiler that cause one or more processors to receive, with the compiler, a program with at least one instruction for graphics processing for operation on at least one non-scalar value, wherein the at least one non-scalar value comprises a value that cannot be stored in a single physical register of a specified size, divide, with the compiler, the at least one instruction for operation on the at least one non-scalar value into a plurality of instructions for operation on constituent scalar values of the at least one non-scalar value, wherein each one of the constituent scalar values can be stored in the single physical register of the specified size, and allocate, with the compiler, a plurality of physical registers to store the constituent scalar values.

In another example, this disclosure describes a device comprising means for receiving, with a processor executing a compiler, a program with at least one instruction for graphics processing for operation on at least one non-scalar value, wherein the at least one non-scalar value comprises a value that cannot be stored in a single physical register of a specified size, means for dividing, with the processor executing the compiler, the at least one instruction for operation on the at least one non-scalar value into a plurality of instructions for operation on constituent scalar values of the at least one non-scalar value, wherein each one of the constituent scalar values can be stored in the single physical register of the specified size, and means for allocating, with the processor executing the compiler, a plurality of physical registers to store the constituent scalar values.

The details of one or more examples are set forth in the accompanying drawings and the description below. Other features, objects, and advantages will be apparent from the description and drawings, and from the claims.

BRIEF DESCRIPTION OF DRAWINGS

FIG. 2A is an example illustration of pseudo code of a graphics processing unit (GPU) program.

FIG. 2B is an example illustration of pseudo code illustrating an example of a lowering function of an instruction selection module of the compiler.

FIG. 2C is an example illustration of pseudo code illustrating additional example functions of the instruction selection module.

FIG. 2D is an example illustration of pseudo code illustrating example functions of a register allocation module of the compiler.

FIG. 2E is an example illustration of pseudo code illustrating example functions of a post-register allocation module of the compiler.

DETAILED DESCRIPTION

Figure 1:
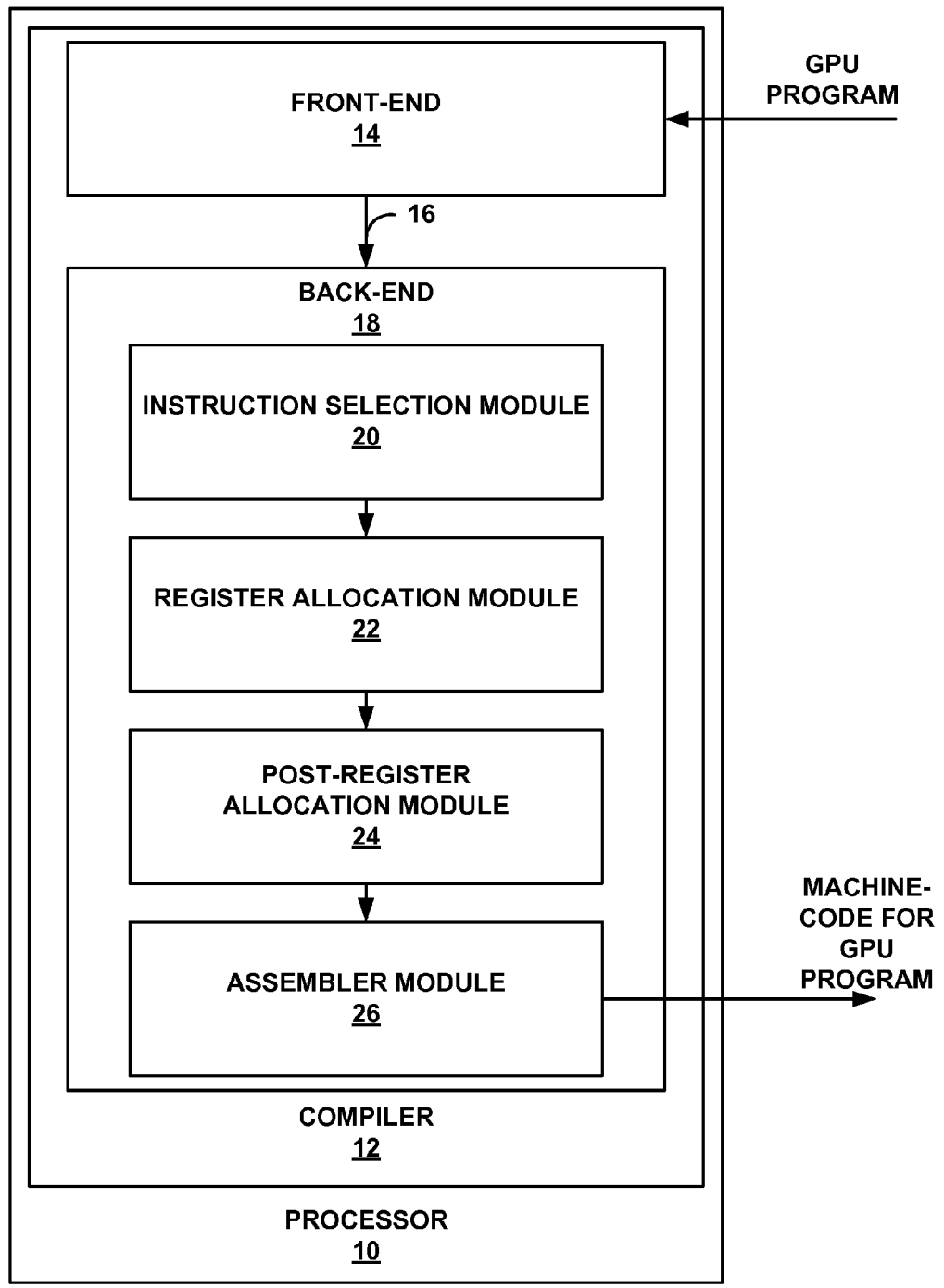
FIG. 1 is a block diagram illustrating a compiler executing on processor.

A graphics processing unit (GPU) program includes instructions that cause the GPU to perform certain functions.

An application developer may develop the GPU program using the syntax of a particular standard, such as the standards defined by the OpenGL specification or the OpenCL specification as two non-limiting examples. GPU programs developed using the OpenGL specification may be referred to as shader programs, and GPU programs developed using the OpenCL specification may be referred to as program kernels. In general, the term "GPU program" refers to any program that includes instructions written in a higher-level programming language that instructs the GPU to perform certain functions. For instance, the term "GPU program" is used to include programs developed using the OpenGL specification, OpenCL specification, or programs developed using any other specification, as well as programs written in any higher-level programming language such as C++.

A compiler, executing on a processor, may translate instructions of the GPU program into assembly language and machine code. For example, the compiler may translate the instructions of the GPU program into intermediate assembly language for processing within the compiler, and generate machine code that causes the GPU to perform functions consistent with the GPU program. The compiler may include a compiler front-end and a compiler back-end.

It should be understood that the various compiler modules, such as the compiler front-end, compiler back-end, and modules within the front-end and back-end, described in this disclosure generally may take the form of functional units of the compiler process executed by a processor. Such functional units are described separately to highlight particular functional aspects of the compiler process, and do not necessarily imply that such aspects must be structured, arranged or coded separately. Accordingly, such functional aspects may be formed integrally or separately, executed on one processor or multiple processors, or multiple processor cores, and the description should not be considered limiting as to the implementation of such functional aspects.

The compiler front-end may process the higher level language GPU program to produce an intermediate output in an assembly language such as the lower level virtual machine (LLVM) assembly language, as one example. A reference manual for the LLVM assembly language is publicly available and can be found at http://llvm.org/docs/LangRef.html. In some examples, the compiler front-end may also confirm that the GPU program conforms to the appropriate syntax. For example, the compiler front-end may confirm that the GPU program conforms to the syntax of the OpenGL or OpenCL specifications.

The compiler back-end receives the intermediate output, e.g., the assembly language output produced by the compiler front-end, and generates the machine code that causes the GPU to perform functions in accordance with the GPU program. The intermediate output may include non-scalar values, and instructions for performing operations on the non-scalar values. Non-scalar values may be values that cannot be stored in a single physical register of a specified size, and require two or more physical registers for storage. For example, non-scalar values may not be able to be stored in a single physical register because the number of bits of the non-scalar values may be greater than the number of bits available in a single physical register.

The compiler back-end may include an instruction selection module, a register allocation module, a post-register allocation module, and an assembler module. As described in more detail, the instruction selection module may divide an instruction for operation on a non-scalar value into a plurality of instructions, e.g., two or more, for operation on scalar values that are constituents of the non-scalar value. Hence, a non-scalar value is broken into multiple scalar values. Scalar values may be values that can be stored in a single physical register, i.e., as a result of the size of the scalar values relative to the larger non-scalar values from which they are derived. The instruction selection module may also assign virtual registers to store the scalar values, and store results of the operations on the scalar values, and associate the virtual registers that store the scalar values to indicate that the scalar values form the non-scalar value, e.g., to maintain the relationship of the scalar values with the original non-scalar value.

The register allocation module of the compiler process executed by a processor may allocate physical registers to the virtual registers. The register allocation module may ensure that a physical register does not inadvertently store two scalar values simultaneously. Also, for associated virtual registers, the register allocation module may associate the physical registers assigned to the associated virtual registers. In some examples, the register allocation module may allocate contiguous physical registers to the associated physical registers. The phrase "contiguous physical registers" means that the indices of the physical registers used to read or write the scalar values in the physical registers are contiguous.

The post-register allocation module of the compiler process executed by the processor may generate an assembly language instruction for the operation on the non-scalar value. For example, the post-register allocation module may recompose the divided instructions, divided by the instruction selection module, for operation on a non-scalar value into an assembly language instruction. The assembly language instruction may include indices of the allocated physical registers that store the scalar values used for the operation on the non-scalar value. The assembler module may receive the assembly language instruction from the post-register allocation module and generate machine code that is executable by the GPU. In other words, the machine code may cause the GPU to perform functions in accordance with the GPU program.

In some examples, the processor may execute the compiler to compile the GPU program and store the compiled GPU program in a device, which includes the GPU, before the device is put into use. In these examples, the machine code of the compiled GPU program may be stored on the device, and the GPU may execute the compiled GPU program. In these examples, the compiled GPU program may be referred to as a pre-compiled GPU program. In some alternate examples, the processor, which is part of the device, may execute the compiler to compile the GPU program. In these examples, the processor may provide the compiled GPU program to the GPU after compilation. In these alternate examples, the compiled GPU program may be referred to as a locally-compiled GPU program.

FIG. 1 is a block diagram illustrating compiler 12 executing on processor 10. Although compiler 12 is illustrated as being within processor 10, it should be understood that the actual code of compiler 12 need not reside within processor 10 in every example. For example, the actual code of compiler 12 may reside off-chip, e.g., not reside in processor 10, in a storage device. FIG. 1 illustrates that compiler 12 is within processor 10 to illustrate that processor 10 executes compiler 12. Examples of processor 10 include, but are not limited to, a digital signal processor (DSP), general purpose microprocessor, application specific integrated circuit (ASIC), field programmable logic array (FPGA), or other equivalent integrated or discrete logic circuitry.

Compiler 12 may include compiler front-end 14 and compiler back-end 18. Compiler back-end 18 may include instruction selection module 20, register allocation module 22, post-register allocation module 24, and assembler module 26. These modules of compiler 12, e.g., compiler front-end 14, compiler back-end 18, and the modules within compiler back-end 18, are illustrated to ease the understanding of compiler 12. For instance, as described above, these modules are described separately to highlight particular functional aspects of compiler 12, and do not necessarily imply that these modules must be structured, arranged, or coded separately.

Compiler 12 may receive the program to be compiled. For example, compiler 12 may receive a program to be executed by a graphics processing unit (GPU). The program to be executed by the GPU may be referred to as a GPU program. The GPU program may be stored on the device that includes processor 10, but aspects of this disclosure are not so limited. As described below, compiler 12 may compile the GPU program to generate machine code which causes the GPU to perform functions consistent with the GPU program.

The GPU program may be developed by an application developer and may be written in a higher level programming language. In some examples, compiler 12 may compile the GPU program before a device that includes the GPU is in use. For example, processor 10 may execute compiler 12 to compile the GPU program and generate the machine code from the GPU program. Processor 10 may then store the compiled GPU program in memory of the device that includes the GPU. The GPU within the device may then execute the machine code. In these examples, the machine code stored in the device that includes the GPU may be referred to as a pre-compiled GPU program. The device that includes the GPU is illustrated in more detail in FIGS. 3A and 3B.

In some examples, compiler 12 may compile the GPU program after the device that includes the GPU is in use. For example, after the device that includes the GPU is in use, the application developer may develop the GPU program. In some these examples, processor 10 may execute compiler 12 to compile the GPU program to generate the machine code from the GPU program, and store the machine code in the device that includes the GPU. In some alternate examples, processor 10 may execute compiler 12 to compile the GPU program to generate the machine code from the GPU program and provide the machine code directly to the GPU without storing the machine code in the device that includes the GPU. In these examples, the machine code may be referred to as a locally-compiled GPU program. In these examples, processor 10 may be formed on the device that includes the GPU.

Compiler front-end 14 processes the GPU program and produces intermediate output 16. Intermediate output 16 may be an intermediate file in an assembly language. For example, intermediate output 16 may be an output in the lower level virtual machine (LLVM) assembly language, although aspects of this disclosure should not be considered limited to the LLVM assembly language. Intermediate output 16 may include a plurality of instructions, e.g., two or more instructions. Some of the instructions may require operation on non-scalar values. As one example, the instructions may include an add operation. The add operation may require adding two non-scalar values together. Non-scalar values may be values that cannot be stored in a single physical register of a specified size, and require two or more physical registers for storage. Each physical register may be of a specified size which indicates the number of bits that can be stored in a physical register. For example, non-scalar values may not be able to be stored in a single physical register because the number of bits of the non-scalar values may be greater than the number of bits available in a single physical register.

A non-scalar value may include a plurality of constituent scalar values. One example of a non-scalar value is a high precision value such as a double precision floating point. Another example of a non-scalar value is a vector of various sizes such as vector of two elements, vector of four elements, vector of eight elements, and so forth. There may be additional examples of non-scalar values, and aspects of this disclosure should not be considered limited to the above examples.

In some examples, compiler front-end 14 may also ensure that the GPU program conforms to the appropriate syntax e.g., the syntax of the OpenGL, OpenCL, or some other specification or programming language. If the GPU program does not conform to the appropriate syntax, compiler 12 may not be able to properly compile the GPU program. In these instances, the developer of the GPU program may be knowledgeable of whether the GPU program will properly execute. For example, the developer may be knowledgeable of whether the pre-compiled or locally-compiled GPU program will properly execute.

Compiler back-end 18 receives intermediate output 16 and processes intermediate output 16 to generate machine code, e.g., object/assembly code, for the GPU. To process intermediate output 16, instruction selection module 20 may perform a lowering function, although lowering may not be required in every example. Lowering may be mapping of the instructions of intermediate output 16 to hardware instructions supported by the GPU. For example, intermediate output 16 may include an instruction for an add operation. In this example, instruction selection module 20 may map the instruction for the add operation from the LLVM assembly language, as one non-limiting example, to an instruction for the add operation in machine code that can be understood by the GPU.

As noted above, intermediate output 16 may include instructions for operations on non-scalar values. Instruction selection module 20, of compiler 12 executing on processor 10, may divide an instruction for operation on a non-scalar value into a plurality of instructions, e.g., two or more instructions, for operation of constituent scalar values of the non-scalar value. The number of constituent scalar values may be two or more constituent scalar values. For example, if the non-scalar value is a vector of eight elements, then the number of constituent scalar values is eight. Scalar values may be values that can be stored in a single physical register. One example of a scalar value is an integer. There may be additional examples of scalar values, and aspects of this disclosure should not be considered limited to the above example. For instance, an instruction within intermediate output 16 may be an instruction to store a non-scalar value. In this example, instruction selection module 20 may divide the store instruction into a plurality of store instructions that operate on each of the constituent scalar values of the non-scalar value.

For purposes of illustration, the scalar values may be considered as operands for the operations. Operands may be constituent scalar values of a non-scalar value or scalar values that are not constituents of a non-scalar value. Accordingly, in this disclosure, the term "operands" and the phrase "scalar values" may be used interchangeably. For example, instruction selection module 20 may divide the instruction for operation on a non-scalar value into a plurality of instructions for operations on operands of the non-scalar value.

Instruction selection module 20 may assign virtual registers to store the operands and the results of the operations upon the operands. Virtual registers are separate from physical registers that store the operands and are used to address the physical registers, as described below. Physical registers may be registers on the device that includes the GPU. The physical registers may be hardware memory registers that can each store a fixed number of digital bits, e.g., may be of a specified size. For example, the physical registers may each store a value that includes up to n bits wide, e.g., 32 bits wide, although each one of the physical registers should not be considered to storing 32 bits. Each one of the physical registers may be configured to have a depth sufficient to store a number m of such n-bit values. The GPU may be able to read values from or write values to the physical registers more quickly than reading values from or writing values to another storage device, such as random access memory (RAM), on the device.

Virtual registers may be considered as logical constructs that act as placeholders for the operands, e.g., scalar values, and the results of the operations on the operands, which may also be scalar values. From the perspective of instruction selection module 20, there may be a pool of unlimited virtual registers that instruction selection module 20 can assign to the operands and the results of the operation.

Instruction selection module 20 may associate the assigned virtual registers with one another for an operation. To associate the assigned virtual registers with one another, instruction selection module 20 may generate an instruction that indicates the association. The instruction may be considered as a map that associates the assigned virtual registers with one another.

As one example, the instruction that associates the assigned virtual registers with an operation may be referred to as a "combine instruction." The term "combine" is provided to ease understanding and to illustrate the association of the assigned virtual registers with another. In general, instruction selection module 20 may use any instruction that associates the assigned virtual registers, and aspects of this disclosure should not be considered limited to only using an instruction referred to as a "combine" instruction.

The combine instruction receives as inputs the assigned virtual registers, and combines them to maintain the relationship between the scalar values that form the operands and the original non-scalar value whose constituents are the scalar values. As described below, register allocation module 22 may allocate contiguous physical registers to the associated virtual registers based on the combine instruction. In some examples, it may be necessary for register allocation module 22 to allocate contiguous physical registers to the associated virtual registers; however, aspects of this disclosure should not be considered so limiting.

Instruction selection module 20 may transmit the plurality of instructions for operations on constituent scalar values, e.g., two or more scalar values, and the combine instruction to register allocation module 22. Register allocation module 22, of compiler 12 executing on processor 10, may allocate physical registers to the virtual registers. To determine which physical registers to allocate, register allocation module 22 may determine which physical registers are available to store operands, e.g., scalar values. For example, not all of the operands may need to be stored in physical registers at the same time. For instance, some operands may need to be stored first, and the results of the operation may need to be stored subsequently. In some examples, an operand may no longer be needed after the operation, and register allocation module 22 may use the same one of the physical registers that stored the operand to store the result of the operation. In alternate examples, the operand may be needed after the operation for a subsequent operation, and register allocation module 22 may not use the same one of the physical registers that stored the operand to store the result of the operation.

The duration that an operand needs to be stored in one of the physical registers may be referred to as a live range. To determine the duration that an operand needs to be stored, register allocation module 22 may determine how many of the instructions, e.g., program points, received from instruction selection module 20 require operation on that operand. For instance, register allocation module 22 may determine whether or not an operand is needed after the operation on that operand. Register allocation module 22 allocates one of the physical registers to store the operand for the live range of that operand. At the end of the live range of that operand, e.g., the end point of the live range, register allocation module 22 marks that one of the physical registers that stored the operand as free for allocation.

If two or more operands have overlapping live ranges, register allocation module 22 may ensure that these operands are not stored in the same one of the physical registers. For example, the GPU program may include an instruction that requires an operation on a first operand, and may include another instruction that requires an operation on a second operand. In this example, the GPU program may require the first operand for another subsequent operation. In this example, the first and second operand may have overlapping live ranges. When compiling the GPU program, register allocation module 22 may not allocate the same one of the physical registers to store the first and second operand.

After determining the live ranges for the physical registers, register allocation module 22 may allocate physical registers to each one of the virtual registers. For example, register allocation module 22 may generate a plurality of instructions that allocate the physical registers to each one of the virtual registers to store the operands or results of the operation. Register allocation module 22 may allocate the physical registers based on the indices of the physical registers. For instance, each one of the physical registers may be addressable by its respective index. Processor 10, e.g., via execution of a driver, may assign each index to each one of the physical registers. The GPU may utilize the scalar values stored in the allocated physical registers for performing functions in accordance with the GPU program.

In some examples, register allocation module 22 may allocate contiguous physical registers for associated virtual registers. Contiguous physical registers means that the indices of the registers are contiguous, i.e., next to one another in a consecutive sequence. Register allocation module 22 may modify all the instructions, from instruction selection module 20 based on the allocated physical registers. For example, register allocation module 22 may replace the virtual registers in the combine instruction with the indices of allocated physical registers. In this manner, the modified combine instruction may indicate that the plurality of instructions for operation on scalar values, e.g., operands, form the original instruction for operation on the non-scalar value.

Allocating contiguous physical registers for associated virtual registers may also maintain the compactness of the instruction on the non-scalar value. For example, the GPU may be able to retrieve a non-scalar value from the physical registers with a single call that includes a range of indices of the physical registers because register allocation module 22 allocated contiguous physical registers to constituent scalar values of the non-scalar value. In this manner, the GPU may not need to make multiple calls to the physical registers to retrieve constituent scalar values of the non-scalar value, which may promote efficient access of the physical registers. Furthermore, in this manner, the GPU may also have fewer instructions to fetch and decode.

Register allocation module 22 may transmit the instructions that allocate the physical registers to store the operands or results of the operation and the modified combine instruction to post-register allocation module 24. Post-register allocation module 24, of compiler 12 executing on processor 10, may generate an instruction for operation on the non-scalar value that includes the indices of the allocated physical registers, which were allocated by register allocation module 22. For example, post-register allocation module 24 may generate an instruction that recomposes the plurality of instructions, originally divided by instruction selection module 20, into an instruction for operation on the non-scalar value. In some examples, it may be necessary for post-register allocation module 24 may recompose the plurality of instructions into an instruction for operation on the non-scalar value; however, aspects of this disclosure should not be considered so limiting.

For instance, based on the combine instruction, post-register allocation module 24 may determine which physical registers store associated operands for the plurality of instructions. Post-register allocation module 24 may recompose the plurality of instructions based on which physical registers store associated operands for the plurality of instructions. Post-register allocation module 24 may also remove the combine instruction because the instruction generated by post-register allocation module 24 already associates, with one another, which physical registers are used to store the results of the operation. Post-register allocation module 24 may transmit the generated instruction to assembler module 26.

Assembler module 26, of compiler 12 executing on processor 10, may convert the instruction generated by post-register allocation module 24 into machine code. As described in more detail with respect to FIGS. 3A and 3B, the GPU may execute the machine code, generated by assembler module 26, to perform functions in accordance with the GPU program. The machine code may include a plurality of digital bits that represent the instructions of the GPU program. The machine code may be in a form of an object file. The GPU may read the object file to perform functions in accordance with the GPU program.

Dividing instructions for operations on non-scalar values, via compiler 12, into a plurality of operations on scalar values and performing operations on the constituent scalar values may allow compiler 12 to efficiently allocate physical registers of the device that include the GPU. For example, compiler 12 may be able to use every one of the physical registers of the device that includes the GPU to store constituent scalar values of a non-scalar value. A conventional compiler may need to group two or more registers together to store a non-scalar value. The conventional compiler may assign the grouped registers to a particular class indicating that registers in that class are used to store non-scalar values. In these instances, for conventional compilers, registers that are not part of the group of registers, e.g., not in the class, could not store a non-scalar value. In these conventional systems, due to some registers not being used for storage of non-scalar values, the conventional compiler may not be able to store all non-scalar values in registers, even though some registers are empty, and may need to store values in a storage device of the device that includes the GPU.

The storage device of the device that includes the GPU is generally different than the physical registers of the device that includes the GPU. For instance, the storage device may be external system memory utilized by the components of the device that includes the GPU. Examples of the storage device, as described in more detail with respect to FIGS. 3A and 3B, may include a random access memory (RAM), a read only memory (ROM), an electrically erasable programmable read-only memory (EEPROM), CD-ROM or other optical disk storage, magnetic disk storage. In general, the latency, power, and bandwidth, for the GPU, to write to or read from the storage device may be greater than the latency, power, and bandwidth, for the GPU, to write to or read from the physical registers. In these examples, efficient memory access may be promoted by the GPU reading values from or writing values to the physical registers, as compared to reading values from or writing values to the storage device.

As described above, in accordance with an example of the disclosure, processor 10 may be configured, e.g., via execution of compiler 12, to allocate each one of the physical registers for storage of a non-scalar value. For example, compiler 12 may divide the instructions for operations on a non-scalar value into a plurality of instructions for operations on constituent scalar values, where each constituent scalar value may comprise a portion of the non-scalar value. Dividing instructions for a non-scalar value into instructions for constituent scalar values may promote efficient allocation of the physical registers. For example, compiler 12 may be able to utilize more of the physical registers for storage as compared to a conventional compiler. Efficient allocation of the physical registers may reduce processing time. For example, writing values to or reading values from the physical registers may be quicker than writing values to or reading values from the storage device.

Moreover, compiler 12 may not need to track which ones of the physical registers belong to particular classes, as with a conventional compiler, which may promote quicker compiling. Tracking which ones of the physical registers belong to which class for storage of non-scalar values and are available for allocation may be processing intensive and may delay compiling the program. In some examples of the disclosure, the physical registers may be considered as belonging to the same class. For example, each one of the physical registers can be used to store constituent scalar values of a non-scalar value, as well as scalar values that are not constituents of a non-scalar value. In this manner, compiler 12 may not be required to assign physical registers to different classes of registers. However, compiler 12 should not be considered as being unable to assign the physical registers to different classes of registers.

In some examples, compiler 12 may also reduce redundancy in the compiled GPU program. The reduction in the redundancy of the compiled GPU program may allow the GPU to more quickly execute the compiled GPU program. For example, when compiler 12 divides an instruction for operation on a non-scalar value into a plurality of instructions for operation on constituent scalar values, compiler 12 may determine whether the instruction for operation on the non-scalar value included any redundancy. For instance, an instruction when divided into its plurality of scalar instructions may show that some of its constituent instructions are not needed. For example, one such scenario may occur when the results of scalar instructions are not used in the rest of the program.

FIG. 2A is an example illustration of pseudo code 28 of a GPU program, such as the GPU program of FIG. 1. As illustrated in FIG. 2A, pseudo code 28 includes variables "a" and "b." Variable "b" may be a non-scalar value, e.g., a vector, that includes two scalar values. Pseudo code 28 assigns variable "a" with the value of variable "b," as illustrated with the instruction "a=b" in FIG. 2A.

FIG. 2B is an example illustration of pseudo code 30 illustrating an example of the front-end module 14 of compiler 12 executing on processor 10. In the example of FIG. 2B, "@a=common global v2i32 0" and "@b=common global v2i32 0" illustrate the representation of the variables "a" and "b" of the original program, e.g., pseudo code 28 of FIG. 2A, in the symbol table of compiler 12. Temporary values used in pseudo code 30 are shown as % tmp. These temporary values are assigned to virtual registers by instruction selection module 20, as described in more detail with respect to FIG. 2C. Pseudo code 30 may be pseudo code for lowering pseudo code 28. In this example, pseudo code 30 includes a load instruction that loads the non-scalar value b into a % tmp temporary, e.g., the "% tmp=load @b, 2" instruction. The number 2 at the end of load instruction indicates that the non-scalar value b includes two constituent scalar values. Pseudo code 30 also includes a store instruction to store the value in the % tmp temporary into the variable a, e.g., the "store % tmp, @a, 2" instruction.

FIG. 2C is an example illustration of pseudo code 32 illustrating the output of the instruction selection module 20 of compiler 12 executing on processor 10. In this example, instruction selection module 20 may generate pseudo code 32 from pseudo code 30. As illustrated in FIG. 2C, instruction selection module 20 may divide instructions from pseudo code 30 into a plurality of instructions for operation on constituent scalar values of the non-scalar value. Instruction selection module 20 may also assign virtual registers, e.g., VR0 and VR1, for storage. For example, instruction selection module 20 may divide the load instruction of pseudo code 30 into two load instructions, e.g., the "VR0=load @b, 1" and the "VR1=load @b+1, 1" instructions illustrated in FIG. 2C. As another example, instruction selection module 20 may divide the store instruction of pseudo code 30 into two store instructions, e.g., the "store VR0 @a, 1" and "store VR1, @a+1, 1" instructions illustrated in FIG. 2C. Each load and store instruction in pseudo code 32 may operate on constituent scalar values, e.g., operands, of non-scalar values.

For example, pseudo code 32 includes a first load instruction that loads a first constituent scalar value of the non-scalar value b into the VR0 virtual register, e.g., "VR0=load @b, 1." Pseudo code 32 includes a second load instruction that loads a second constituent scalar value of the non-scalar value b into the VR1 virtual register, e.g., "VR1=load@b+1, 1." In this example, the first and second load instructions of pseudo code 32 form the load instruction of pseudo code 30. Also, in this example, the first and second scalar values loaded into the VR0 and VR1 virtual registers of pseudo code 32 are constituents of the loaded value corresponding to non-scalar variable "b" of pseudo code 30.

As another example, pseudo code 32 includes a first store instruction that stores the value in the VR0 virtual register into a first constituent scalar value of the non-scalar value a, e.g., "store VR0, @a, 1." Pseudo code 32 includes a second store instruction that stores the value in the VR1 virtual register into a second constituent scalar value of the non-scalar value a, e.g., "store VR1, @a+1, 1." In this example, the first and second store instructions of pseudo code 32 form the store instruction of pseudo code 30. Also, in this example, the first and second scalar values that store the values of the VR0 and the VR1 virtual registers are constituents of the stored value corresponding to non-scalar variable "a" of pseudo code 30.

As illustrated in FIG. 2C, instruction selection module 20 may also generate a combine instruction, e.g., the "combine VR0, VR1" instruction in pseudo code 32. The combine instruction, of pseudo code 32, may associate the virtual registers VR0 and VR1 together, e.g., with one another. In this manner, instruction selection module 20 may indicate that scalar values loaded into the VR0 and VR1 virtual registers are constituent scalar values of the same non-scalar value.

FIG. 2D is an example illustration of pseudo code 34 illustrating example functions of register allocation module 22 of compiler 12 executing on processor 10. As illustrated in FIG. 2D, register allocation module 22 allocates the physical registers of the device that includes the GPU with indices % R0 and % R1 to the virtual registers VR0 and VR1 of pseudo code 32. Indices % R0 and % R1 may be indices for contiguous physical registers of the device that includes the GPU. The GPU may utilize the scalar values stored in the allocated physical registers for performing functions in accordance with the GPU program. In this example, register allocation module 22 may determine which ones of the physical registers to allocate based on the live ranges of the physical registers. For instance, the live ranges of the physical registers may indicate which ones of the physical register are available for storage of operands and at what time. In some examples, register allocation module 22 may need to evaluate live ranges of contiguous physical registers to determine which ones of physical registers should be allocated.

Also, as illustrated in FIG. 2D, register allocation module 22 may modify the instructions of pseudo code 22. For example, the combine instruction of pseudo code 34 illustrates that register allocation module 22 replaced the VR0 and VR1 virtual registers of pseudo code 52 with the indices of physical registers, e.g., % R0 and % R1, respectively. For instance, the combine instruction of pseudo code 34 includes the "combine % R0, % R1," instruction. In pseudo code 34, register allocation module 22 may then indicate that values loaded into physical registers with indices % R0 and % R1 are stored in the constituent scalar values of the non-scalar value a.

FIG. 2E is an example illustration of pseudo code 36 illustrating example functions of post-register allocation module 24 of compiler 12 executing on processor 10. Post-register allocation module 24 may recompose the instruction that was divided in instruction selection module 20. In some examples, the recomposed instruction may include the allocated registers allocated by register allocation module 22. For example, post-register allocation module 24 may generate the "{% R0, % R1}=load @b, 2" instruction and "store {% R0, % R1} @a, 2" instruction as illustrated in pseudo code 36. These instructions of pseudo code 36 may be similar to the instructions of pseudo code 30, e.g., the "store % tmp, @a, 2," instruction of pseudo code 30, but include the contiguous indices of the physical registers.

Also, as illustrated in pseudo code 36, post-register allocation module 24 drops the combine instruction. For example, the "{% R0, % R1}=load @b, 2" and "store {% R0, % R1} @a, 2" instructions of pseudo code 36 each indicate the indices of the physical registers associated with one another by register allocation module 42. The combine instruction may guide register allocation module 22 to allocate contiguous registers, and for post-register allocation module 24 to combine the instructions. Subsequently, the combine instruction may be dropped, during the recomposition of the instructions in the post-register allocation module 24.

Assembler module 26 of compiler 12 executing on processor 10 may receive pseudo code 36 and translate pseudo code 36 into machine code, e.g., pre-compiled GPU program or locally-compiled GPU program. For example, based on pseudo code 36, assembler module 26 may generate the machine code. The machine code may be a series of binary bits, e.g., digital ones and zeros. The machine code may executable by the GPU, and may cause GPU to perform functions in accordance with the GPU program, e.g., pseudo code 28 of FIG. 2A.

Figure 3A:
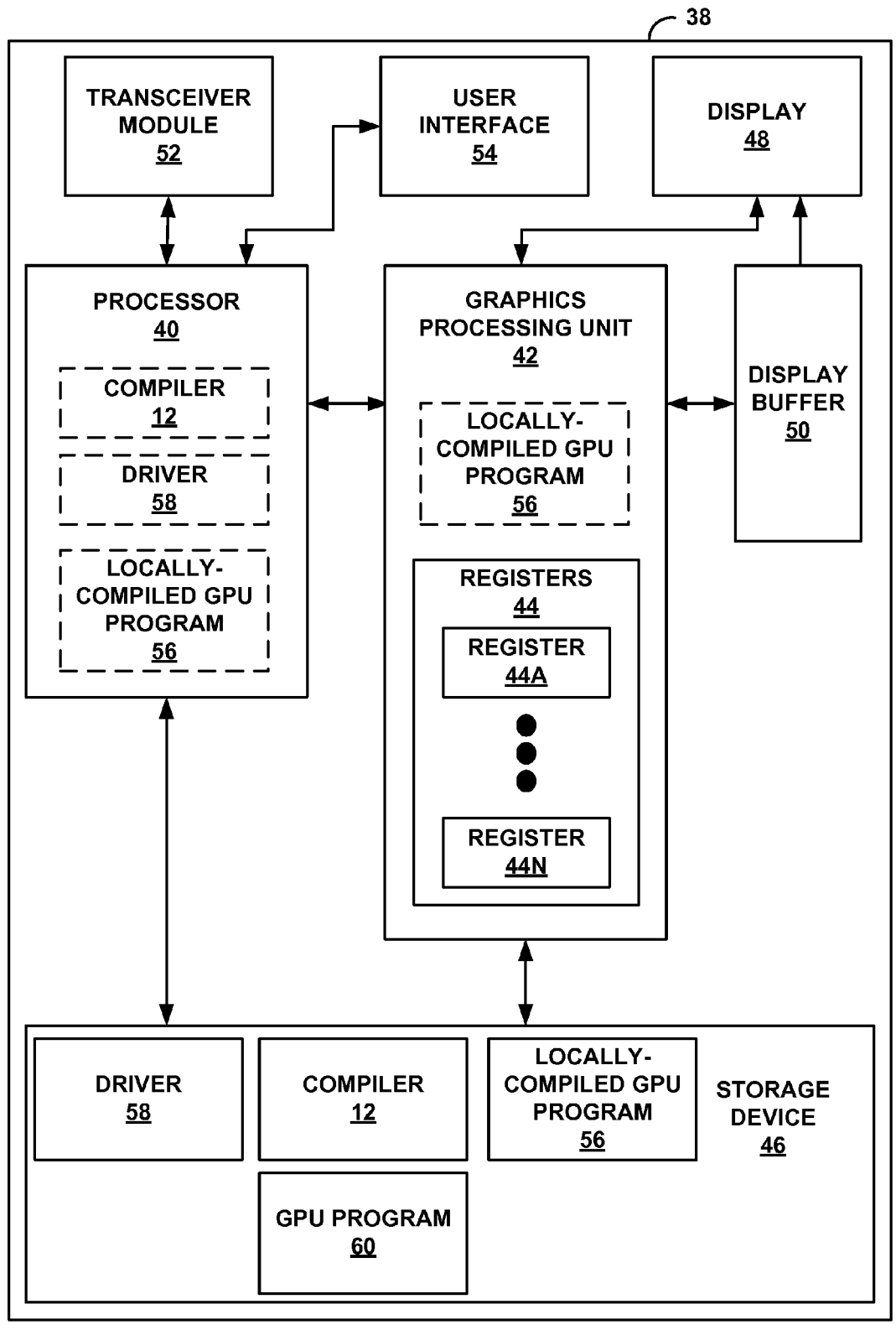
FIG. 3A is a block diagram illustrating a device that may be configured to implement aspects of this disclosure.

FIG. 3A is a block diagram illustrating a device 38 that may be configured to implement aspects of this disclosure. Examples of device 38 include, but are not limited to, mobile wireless telephones, personal digital assistants (PDAs), video gaming consoles coupled to video displays, mobile video conferencing units, laptop computers, desktop computers, tablet computers, television set-top boxes, digital media players, portable gaming devices, and the like. Device 38 may include processor 40, graphics processing unit (GPU) 42, storage device 46, display 48, display buffer 50, transceiver module 52, and user interface 54. In some examples, GPU 42 includes physical register 44A-44N (collectively referred to as "physical registers 44"), as illustrated in FIG. 3A. Processor 40 may be one example of processor 10 of FIG. 1.

Although processor 40 and GPU 42 are illustrated as separate units, aspects of this disclosure are not so limited. As one example, GPU 42 may be formed within processor 40. Moreover, although physical registers 44 are illustrated as being formed within GPU 42, in alternate examples, physical registers 44 may be formed external to GPU 42. Processor 40, GPU 42, or both, each may include a single processor core or multiple processor cores.

Device 38 may include additional modules or units not shown in FIG. 3A for purposes of clarity. For example, device 38 may include a speaker and a microphone, neither of which are shown in FIG. 3A, to effectuate telephonic communications in examples where device 38 is a mobile wireless telephone, or a speaker where device 38 is a media player. Furthermore, the various modules and units shown in device 38 may not be necessary in every example of device 38. For example, user interface 54 and display 48 may be external to device 38 in examples where device 38 is a desktop computer or other device that is equipped to interface with an external user interface or display.

Physical registers 44 may be hardware memory registers that can each store a fixed number of digital bits. In other words, each one of physical registers 44 may be of a specified size for the number of bits that can be stored in each one of physical registers 44. For example, physical registers 44 may each store a value that includes up to n bits wide, e.g., 32 bits wide, although each one of physical registers 44 should not be considered limited to storing 32 bits. Physical registers 44 may be configured to have a depth sufficient to store a number m of such n-bit values. In some examples, the specified size of each one of physical registers 44 may be such that each one of physical registers 44 can store a scalar value, but cannot store a non-scalar value. For instance, the number of bits needed to store a scalar value may be less than or equal to the number of bits of each one of physical registers 44. In this example, the number of bits needed to store a non-scalar value may be greater than the number of bits of each one of physical registers 44. As described in more detail, compiled GPU program 56 may indicate which ones of physical registers 44 should be used to store values used by compiled GPU program 56.

Examples of processor 40 and GPU 42 include, but are not limited to, a digital signal processor (DSP), general purpose microprocessor, application specific integrated circuit (ASIC), field programmable logic array (FPGA), or other equivalent integrated or discrete logic circuitry. Storage device 46 may comprise one or more computer-readable storage media. Examples of storage device 46 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to store desired program code in the form of instructions or data structures and that can be accessed by a computer or a processor. In some example implementations, storage device 46 may include instructions that cause processor 40 and/or GPU 42 to perform the functions ascribed to processor 40 and GPU 42 in this disclosure.

Storage device 46 may, in some examples, be considered as a non-transitory storage medium. The term "non-transitory" may indicate that the storage medium is not embodied in a carrier wave or a propagated signal. However, the term "non-transitory" should not be interpreted to mean that storage device 46 is non-movable. As one example, storage device 46 may be removed from device 38, and moved to another device. As another example, a storage device, substantially similar to storage device 46, may be inserted into device 38. In certain examples, a non-transitory storage medium may store data that can, over time, change (e.g., in RAM).

Examples of user interface 54 include, but are not limited to, a trackball, a mouse, a keyboard, and other types of input devices. User interface 54 may also be a touch screen and may be incorporated as a part of display 48. Transceiver module 52 may include circuitry to allow wireless or wired communication between device 38 and another device or a network. Transceiver module 52 may include modulators, demodulators, amplifiers and other such circuitry for wired or wireless communication.

As illustrated in FIG. 3A, storage device 46 includes driver 58, GPU program 60, and compiler 12. In some examples, storage device 46 may also include locally-compiled GPU program 56; however, aspects of this disclosure are not so limited. For example, as described below, processor 40 may execute compiler 12 to compile GPU program 60 to generate locally-compiled GPU program 56. In some examples, processor 40 may store locally-complied GPU program 56 within storage device 46. GPU 42 may then execute locally-complied GPU program 56 from storage device 46. In some alternate examples, processor 40 may directly provide locally-compiled GPU program 56 to GPU 42 without storing locally-compiled GPU program 56 to storage device 46. In these examples, every time GPU 42 wants to execute GPU program 60, processor 40 may generate locally-compiled GPU program 56 on the fly.

Driver 58 may be software that allows processor 40 to communicate with GPU 42. For example, when GPU 42 should execute locally-compiled GPU program 56, as determined by processor 40, driver 58 may load locally-compiled GPU program 56 into GPU 42 for execution. For purposes of illustration, driver 58 is shown in dashed lines within processor 40 to indicate that processor 40 executes driver 58.

GPU program 60 may be a GPU program in a higher-level programming language for causing GPU 42 to perform functions in accordance with GPU program 60. For instance, GPU program 60 may be one example of the GPU program of FIG. 1. Examples of GPU program 60 include, but are not limited to, a shader program and program kernels. An application developer may develop GPU program 60, which when executed, causes GPU 42 to perform functions in accordance with GPU program 60. For example, the application developer may write instructions using a higher-level programming language that forms GPU program 60. The application developer may develop GPU program 60 using the syntax of a particular standard, such as the OpenGL specification or the OpenCL specification as two non-limiting examples. GPU program 60 may include programs developed using the OpenGL specification, OpenCL specification, or programs developed using any other specification, as well as programs written in any higher-level programming language such as C++.

GPU program 60 may cause GPU 42 to perform various graphics processing functions. For instance, the applications executed on processor 40 may generate viewable content in the form of an image or series of images. GPU program 60 may cause GPU 42 to render the image or series of images on display 48. For example, GPU program 60 may cause GPU 42 to perform coloring and shading of pixels to be displayed on display 48, as well as cull pixels that are not going to be displayed on display 48.

In some examples, as GPU 42 renders the image, GPU 42 may output the rendered portions of the image to display buffer 50. Display buffer 50 may temporarily store the rendered pixels of the rendered image until the entire image is rendered. Display buffer 50 may be considered as an image frame buffer. Display buffer 50 may then transmit the rendered image to be displayed on display 48. In some alternate examples, GPU 42 may output the rendered portions of the image directly to display 48 for display, rather than temporarily storing the image in display buffer 50. Display 48 may comprise a liquid crystal display (LCD), an organic light emitting diode display (OLED), a cathode ray tube (CRT) display, a plasma display, or another type of display device.

For GPU 42 to execute GPU program 60, processor 40 may need to first compile GPU program 60 to generate machine code, e.g., locally-compiled GPU program 56. To compile GPU program 60, processor 40 may execute compiler 12. For instance, as described above, front-end 14, of compiler 12, may produce intermediate output 16 from GPU program 16, as well as, confirm that GPU program 60 conforms to the appropriate syntax.

GPU program 60 may include one or more instructions for operation on non-scalar values. Instruction selection module 20 may divide each instruction for operation on non-scalar values, of GPU program 60, into a plurality of instructions for operation of constituent scalar values, and assign virtual registers to each of the constituent scalar values. Instruction selection module 20 may also associate the virtual registers with one another assigned to the constituent scalar values, e.g., with a combine instruction.

Register allocation module 22 may allocate physical registers 44 to store the constituent scalar values based on the live ranges of physical registers 44. In some examples, register allocation module 22 may allocate contiguous physical registers 44 to store the constituent scalar values. Register allocation module 22 may also associate the allocated physical registers 44 with one another, e.g., by modifying the instructions from instruction selection module to include the allocated physical registers 44. GPU 42 may utilize the scalar values stored in the allocated physical registers 44 for performing functions in accordance with GPU program 60.

Post-register allocation module 24 may recompose the plurality of instructions based on which physical registers 44 store associated scalar values for the plurality of instructions to generate an instruction for assembler module 26. Post-register allocation module 24 also removes the combine instruction, in some examples. Assembler module 26 may convert the instruction generated by post-register allocation module 24 into machine code.

Compiler 12, executing on processor 40, may perform these functions for each of the instructions, of GPU program 60, that require operation on non-scalar values. The resulting machine code, from assembler module 26, may be locally-compiled GPU program 56. As described above, processor 40 may then store locally-compiled GPU program 56 in storage device 46 for subsequent execution by GPU 42, or may transmit locally-compiled GPU program 56 to GPU 42 for execution, without storing locally-compiled GPU program 56 in storage device 46.

Figure 3B:
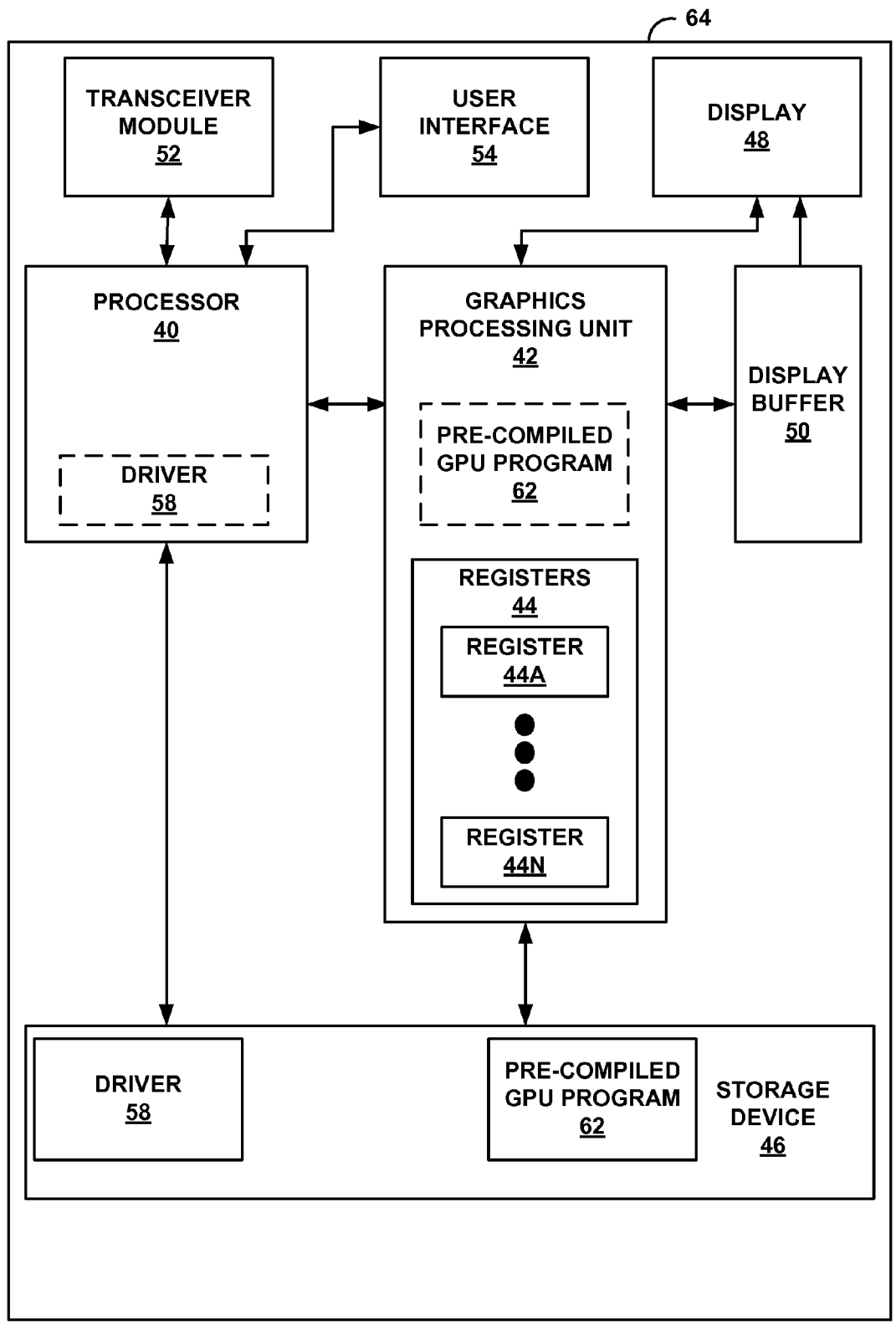
FIG. 3B is a block diagram illustrating another device that may be configured to implement aspects of this disclosure.

FIG. 3B is a block diagram illustrating another device 64 that may be configured to implement aspects of this disclosure. Device 64, illustrated in FIG. 3B, may be substantially similar to device 38, illustrated in FIG. 3A. However, storage device 46 of FIG. 3B may not store compiler 12 or GPU program 60, and processor 40 of device 64 may not execute compiler 12. In the example of FIG. 3B, GPU program 60 may have been pre-complied with a processor, similar to processor 10 of FIG. 1, that is not formed on device 64. In this example, the processor may compile GPU program 60 and store the resulting code in storage device 46, e.g., pre-compiled GPU program 62. Pre-compiled GPU program 62 may be substantially similar to locally-compiled GPU program 56, of FIG. 3A. For example, a processor may generate pre-compiled GPU program 62 in a manner substantially similar to the manner in which processor 40, executing compiler 12, generated locally-compiled GPU program 56. However, rather than being locally-compiled, pre-compiled GPU program 62 may have been compiled by a computing device other than device 64. The computing device may store pre-compiled GPU program 62 within storage device 46, and GPU 42 may execute pre-compiled GPU program 62.

Figure 4:
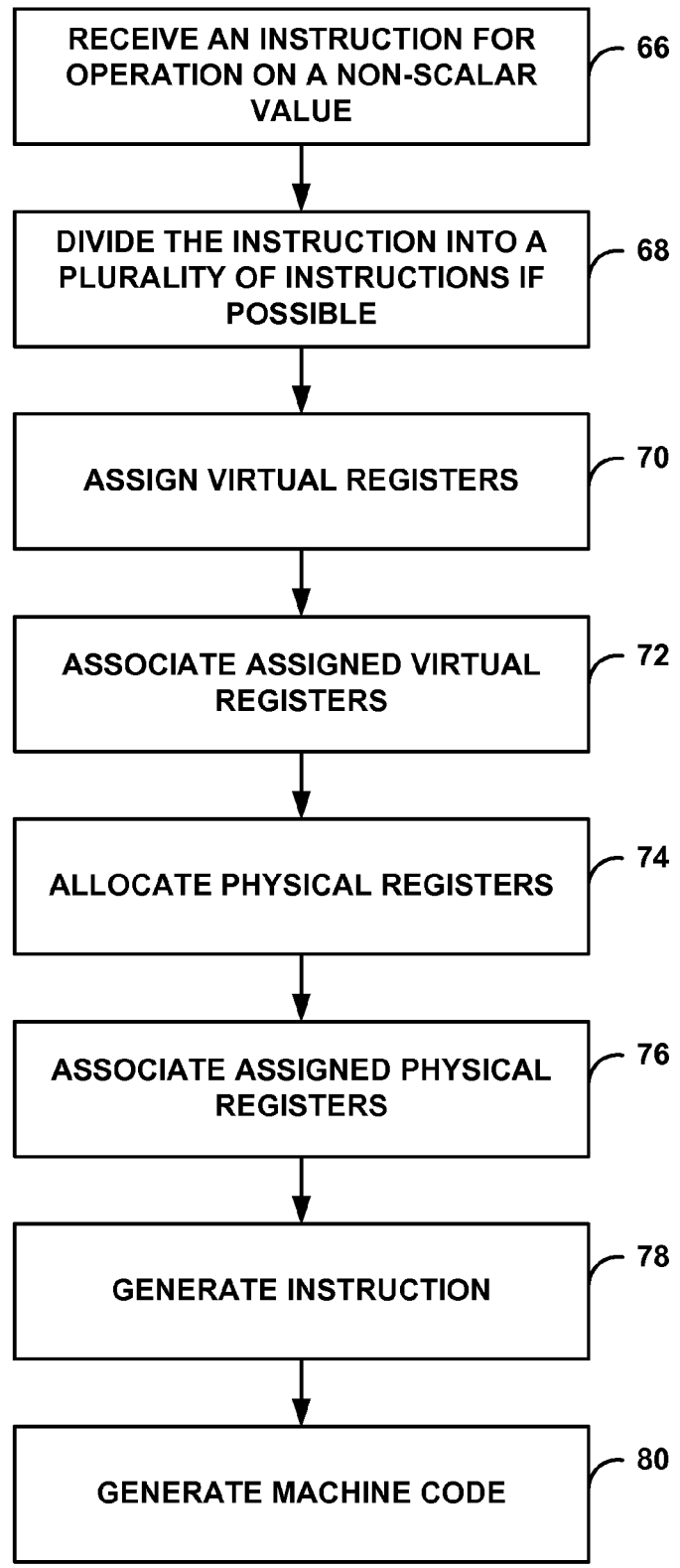
FIG. 4 is a flow diagram illustrating an example operation of the compiler.

FIG. 4 is a flow diagram illustrating an example operation of compiler 12. For purposes of illustration reference is made to FIGS. 1, 3A, and 3B. For instance, the following describes implementing the flow diagram of FIG. 4 with the modules illustrated in FIG. 1. However, it should be noted that the modules, illustrated in FIG. 1, performing the functions of the flow diagram of FIG. 4 is provided for illustration purposes. The example illustrated in FIG. 4 should not be considered limited to being performed only by the modules illustrated in FIG. 1. Modules, other than the modules illustrated in FIG. 1, may perform the functions illustrated in FIG. 4.

Instruction selection module 20 may receive an instruction for operation on a non-scalar value (66). The instruction for operation on the non-scalar value may have originated from GPU program 60. For instance, compiler front-end 14 may receive an original instruction for operation from GPU program 60. The original instruction may be in a higher-level programming language. Compiler front-end 14 may process the original instruction and translate the original instruction into intermediate output 16, which may be in the LLVM assembly language, as one example. Instruction selection module 20 may receive the instruction for operation on the non-scalar value from compiler front-end 14 via intermediate output 16.

Instruction selection module 20 may divide the instruction, if possible, for operation on the non-scalar value into a plurality of instructions for operation on constituent scalar values of the non-scalar value (68). For example, instruction selection module 20 may receive an instruction for operation on a non-scalar value that includes two or more constituent scalar values, e.g., a first constituent scalar value and a second constituent scalar value, or more than a first and second constituent scalar value. The number of constituent scalar values may be based on the number of scalar values that form the non-scalar value. For example, if the non-scalar value is vector 16, then there are sixteen constituent scalar values that form the vector 16. The first and second constituent scalar values, in this example, are provided for illustration and ease of understanding, realizing that there may be more than two constituent scalar values for a non-scalar value. In this example, instruction selection module 20 may divide the instruction for operation on the non-scalar value into a first instruction for operation on the first constituent scalar value and a second instruction for operation on the second constituent scalar value.

Instruction selection module 20 may assign virtual registers to store each one of the constituent scalar values (70). Virtual registers may be a logical constructs, and from the perspective of instruction selection module 20 there may be an unlimited number of virtual registers. Instruction selection module 20 may also associate the assigned virtual registers (72). For example, instruction selection module 20 may generate a combine instruction that includes the assigned virtual registers.

Register allocation module 22 may allocate physical registers 44 to the assigned virtual registers (74). For example, register allocation module 22 may determine the live ranges for each one of the constituent scalar values to determine which physical registers 44 to allocate. Register allocation module 22 may ensure that a same one of physical registers 44 does not store two scalar values at the same time, e.g., when the two scalar values include overlapping live ranges. In some examples, register allocation module 22 may allocate physical registers 44 with contiguous indices, e.g., contiguous physical registers 44.

Register allocation module 22 may associate the assigned physical registers 44 (76). For example, register allocation module 22 may modify the instructions from instruction selection module 20. Register allocation module 22 may also replace the virtual addresses in the combine instruction from instruction selection module 20 with the indices of the allocated physical registers 44.

Post-register allocation module 24 may generate a recomposed instruction that includes the indices of the allocated physical registers 44 (78). For example, post-register allocation module 24 may recompose an instruction based on the divided instructions, divided by instruction selection module 20. The recomposed instruction may include the indices of physical registers 44 allocated by register allocation module 22. Assembler module 26 may generate machine code from the instruction generated by post-register allocation module 24 (80). The machine code may be a series of binary bits, e.g., digital ones and zeros which may be executable by GPU 42, e.g., locally-compiled GPU program 56 or pre-compiled GPU program 62. The machine code may cause GPU 42 to perform functions in accordance with GPU program 60.

In one or more examples, the functions described may be implemented in hardware, software, firmware, or any combination thereof. If implemented in software, the functions may be stored as one or more instructions or code on an article of manufacture comprising a non-transitory computer-readable medium. Computer-readable media may include computer data storage media or communication media including any medium that facilitates transfer of a computer program from one place to another. Data storage device may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
receiving, with a processor executing a compiler, a program with at least one instruction for graphics processing for operation on at least one non-scalar value, wherein the at least one non-scalar value comprises a value that cannot be stored in a single physical register of a specified size;
dividing, with the processor executing the compiler, the at least one instruction for operation on the at least one non-scalar value into a plurality of instructions for operation on constituent scalar values of the at least one non-scalar value, wherein each one of the constituent scalar values can be stored in the single physical register of the specified size;
allocating, with the processor executing the compiler, a plurality of physical registers to store the constituent scalar values; and
recomposing, with the processor executing the compiler, the plurality of instructions for operation on the constituent scalar values into a recomposed instruction for operation on the non-scalar value, wherein the recomposed instruction includes indices to the allocated physical registers.

2. The method of claim 1, further comprising:
assigning, with the processor executing the compiler, a plurality of virtual registers to each one of the constituent scalar values,
wherein allocating the plurality of physical registers comprises allocating the plurality of physical registers based on the assigned virtual registers.

3. The method of claim 1, further comprising:
associating, with the processor executing the compiler, the allocated physical registers with one another to indicate that the constituent scalar values are constituent scalar values of the non-scalar value.

4. The method of claim 3, wherein associating the allocated physical registers with one another comprises generating an instruction that associates the allocated physical registers with one another.

5. The method of claim 4, wherein the instruction that associates the allocated physical registers with one another comprises a combine instruction.

6. The method of claim 1, wherein allocating the plurality of physical registers comprises allocating a plurality of contiguous physical registers.

7. The method of claim 1, wherein allocating the plurality of physical registers comprises allocating the plurality of physical registers based on a live range of each one of the constituent scalar values.

8. The method of claim 1, further comprising:
generating, with the processor executing the compiler, machine code for the recomposed instruction for causing a graphics processing unit (GPU) to perform functions in accordance with the instruction for operation on the non-scalar value.

9. The method of claim 1, wherein the program with the at least one instruction for graphics processing causes a graphics processing unit (GPU) to perform functions in accordance with the program.

10. A device comprising:
a plurality of physical registers that are each of a specified size; and
a processor executing a compiler that is configured to:
receive a program with at least one instruction for graphics processing for operation on at least one non-scalar value, wherein the at least one non-scalar value comprises a value that cannot be stored in the specified size of a single physical register of the plurality of physical registers;
divide the at least one instruction for operation on the at least one non-scalar value into a plurality of instructions for operation on constituent scalar values of the at least one non-scalar value, wherein each one of the constituent scalar values can be stored in the specified size of the single physical register;
allocate two or more physical registers of the plurality of physical registers to store the constituent scalar values; and
recompose the plurality of instructions for operation on the constituent scalar values into a recomposed instruction for operation on the non-scalar value, wherein the recomposed instruction includes indices to the allocated physical registers.

11. The device of claim 10, further comprising a graphics processing unit (GPU) that comprises the plurality of physical registers.

12. The device of claim 10, wherein the processor is configured to assign a plurality of virtual registers to each one of the constituent scalar values and allocate the two or more physical registers based on the assigned virtual registers.

13. The device of claim 10, wherein the processor is configured to associate the allocated two or more physical registers with one another to indicate the constituent scalar values are constituent scalar values of the non-scalar value.

14. The device of claim 13, wherein the processor is configured to generate an instruction that associates the allocated two or more physical registers with one another to associate the allocated two or more physical registers with one another.

15. The device of claim 14, wherein the instruction that associates the allocated two or more physical registers with one another comprises a combine instruction.

16. The device of claim 10, wherein the allocated two or more physical registers comprise contiguous physical registers.

17. The device of claim 10, wherein the processor is configured to allocate the two or more physical registers based on a live range of each one of the constituent scalar values.

18. The device of claim 10, further comprising a graphics processing unit (GPU), wherein the program with the at least one instruction for graphics processing causes the GPU to perform functions in accordance with the program.

19. A non-transitory computer-readable storage medium comprising instructions for a compiler that cause one or more processors to:
receive, with the compiler, a program with at least one instruction for graphics processing for operation on at least one non-scalar value, wherein the at least one non-scalar value comprises a value that cannot be stored in a single physical register of a specified size;
divide, with the compiler, the at least one instruction for operation on the at least one non-scalar value into a plurality of instructions for operation on constituent scalar values of the at least one non-scalar value, wherein each one of the constituent scalar values can be stored in the single physical register of the specified size;
allocate, with the compiler, a plurality of physical registers to store the constituent scalar values; and
recompose, with the compiler, the plurality of instructions for operation on the constituent scalar values into a recomposed instruction for operation on the non-scalar value, wherein the recomposed instruction includes indices to the allocated physical registers.

20. The non-transitory computer-readable storage medium of claim 19, further comprising instructions that cause the one or more processors to:
assign a plurality of virtual registers to each one of the constituent scalar values,
wherein the instructions that cause the one or more processors to allocate the plurality of physical registers comprise instructions that cause the one or more processors to allocate the plurality of physical registers based on the assigned virtual registers.

21. The non-transitory computer-readable storage medium of claim 19, further comprising instructions that cause the one or more processors to:
associate the allocated physical registers with one another to indicate that the constituent scalar values are constituent scalar values of the non-scalar value.

22. The non-transitory computer-readable storage medium of claim 21, wherein the instructions that cause the one or more processors to associate the allocated physical registers with one another comprise instructions that cause the one or more processors to generate an instruction that associates the allocated physical registers with one another.

23. The non-transitory computer-readable storage medium of claim 22, wherein the instruction that associates the allocated physical registers comprises a combine instruction.

24. The non-transitory computer-readable storage medium of claim 19, wherein the instructions that cause the one or more processors to allocate the plurality of physical registers comprise instructions that cause the one or more processors to allocate a plurality of contiguous physical registers.

25. The non-transitory computer-readable storage medium of claim 19, wherein the instructions that cause the one or more processors to allocate the plurality of physical registers comprise instructions that cause the one or more processors to allocate the plurality of physical registers based on a live range of each one of the constituent scalar values.

26. The non-transitory computer-readable storage medium of claim 19, wherein the program with the at least one instruction for graphics processing causes a graphics processing unit (GPU) to perform functions in accordance with the program.

27. A device comprising:
means for receiving, with a processor executing a compiler, a program with at least one instruction for graphics processing for operation on at least one non-scalar value, wherein the at least one non-scalar value comprises a value that cannot be stored in a single physical register of a specified size;

means for dividing, with the processor executing the compiler, the at least one instruction for operation on the at least one non-scalar value into a plurality of instructions for operation on constituent scalar values of the at least one non-scalar value, wherein each one of the constituent scalar values can be stored in the single physical register of the specified size;

means for allocating, with the processor executing the compiler, a plurality of physical registers to store the constituent scalar values; and means for recomposing, with the processor executing the compiler, the plurality of instructions for operation on the constituent scalar values into a recomposed instruction for operation on the non-scalar value, wherein the recomposed instruction includes indices to the allocated physical registers.

28. The device of claim 27, further comprising:
means for assigning a plurality of virtual registers to each one of the constituent scalar values,
wherein the means for allocating the plurality of physical registers comprises means for allocating the plurality of physical registers based on the assigned virtual registers.

29. The device of claim 27, further comprising:
means for associating the allocated physical registers with one another to indicate that the constituent scalar values are constituent scalar values of the non-scalar value.

30. The device of claim 29, wherein the means for associating the allocated physical registers with one another comprises means for generating an instruction that associates the allocated physical registers with one another.

31. The device of claim 30, wherein the instruction that associates the allocated physical registers with one another comprises a combine instruction.

32. The device of claim 27, wherein the means for allocating the plurality of physical registers comprises means for allocating a plurality of contiguous physical registers.

33. The device of claim 27, wherein the means for allocating the plurality of physical registers comprises means for allocating the plurality of physical registers based on a live range of each one of the constituent scalar values.

34. The device of claim 27, further comprising a graphics processing unit (GPU), wherein the program with the at least one instruction for graphics processing causes the GPU to perform functions in accordance with the program.

\* \* \* \* \*